United States Patent [19]

Musha

[11] 4,390,781

[45] Jun. 28, 1983

[54] METHOD AND APPARATUS FOR DETECTING FOCUSSING ERROR SIGNAL OF OBJECTIVE LENS

[75] Inventor: Toru Musha, Hachioji, Japan

[73] Assignee: Olympus Optical Co. Ltd., Japan

[21] Appl. No.: 195,075

[22] Filed: Oct. 8, 1980

Related U.S. Application Data

[63] Continuation-in-part of Ser. No. 161,428, Jun. 20, 1980, abandoned.

[30] Foreign Application Priority Data

Jun. 25, 1979 [JP] Japan .................................. 54-79943

[51] Int. Cl.$^3$ ............................................. G01J 1/36
[52] U.S. Cl. ...................................... 250/204; 369/45
[58] Field of Search ............. 250/201, 204; 354/25 R; 356/4; 369/45

[56] References Cited

U.S. PATENT DOCUMENTS 4,357,533 11/1982 Winslow ............................ 250/204

Primary Examiner—David C. Nelms
Assistant Examiner—Darwin R. Hostetter
Attorney, Agent, or Firm—Parkhurst & Oliff

[57] ABSTRACT

In a method for detecting a focussing error signal of an objective lens with respect to a video disc on which a light beam emitted from a laser light source is to be focussed as a light spot by the objective lens, a light flux reflected by the video disc is made incident upon a detection prism surface which is set substantially at a critical angle with respect to a central light ray in the reflected light flux, and two light fluxes which situate on respective sides of a boundary plane including the central light ray and perpendicular to a plane of incidence, and are reflected by the reflection surface are separately received by two light receiving regions which are divided along a boundary plane including the central light ray reflected by the reflection surface and perpendicular to the plane of incidence. The focussing error signal is derived as a difference between output signals from the two light receiving regions.

36 Claims, 20 Drawing Figures

In-Focussed Condition

Light Flux Reflected
by Disc 6

FIG_10

METHOD AND APPARATUS FOR DETECTING FOCUSSING ERROR SIGNAL OF OBJECTIVE LENS

BACKGROUND OF THE INVENTION

This application is a continuation-in-part of application Ser. No. 161,428 filed June 20, 1980, now abandoned.

The present invention relates to a method for detecting a focussing condition of an objective lens with respect to an object on which a light spot has to be focussed by said objective lens and to an apparatus for carrying out such a focus detecting method.

Such focus detecting method and apparatus are advantageously applied to an apparatus in which a scanning light spot is projected by an objective lens onto one or more information tracks recorded spirally or concentrically on a disc-shaped record medium to read information recorded along the track.

In an apparatus for reproducing or picking-up information from the above mentioned record medium, the record medium is usually called a video disc in which encoded video and audio signals are recorded as optical information such as optical transmitting, reflection and phase properties. While the video disc is rotated at a high speed such as thirty revolutions per second, i.e. 1,800 rpm, a laser beam emitted from a laser light source such as a helium-neon gas laser is focussed on the tracks of the disc as a light spot and the optical information is read out. One of the important properties of such a record medium is a very high density of recorded information and thus the width of the information track is very narrow and the space between successive tracks is also very narrow. In a typical video disc described in, for instance, Philips Technical Review, Vol. 33, 1973, No. 7, the pitch of the tracks amounts only to 2 $\mu$m. Therefore, the diameter of light spot should be correspondingly small such as 1 to 2 $\mu$m. In order to pick-up correctly the recorded information from such tracks having very narrow width and pitch, any error in the distance between the objective lens and the tracks, i.e. a focussing error, should be reduced to as little as possible to make a spot diameter as small as possible.

To this end, the apparatus is provided with a focussing control system in which an amount and a direction of a de-focussed condition of the objective lens with respect to the disc surface are detected to produce a focussing error signal and the objective lens is moved in a direction of the optical axis of the objective lens in accordance with the detected focussing error signal.

FIG. 1 is a schematic view illustrating a known focus detection system in an optical pick-up apparatus. A light source 1 is constituted by a laser and emits light which is linearly polarized in a plane of the drawing of FIG. 1. The light is colliminated by a collimator lens 2 into a parallel light beam which is then transmitted through a polarizing prism 3 and a quarter-wavelength plate 4. The light beam is further focussed by an objective lens 5 as a light spot on a disc 6 having one or more information tracks of crenellated pit construction. Then, the light is reflected by the information track and impinges upon the polarizing prism 3 by means of the objective lens 5 and the quarter-wavelength plate 4. The light impinging on the prism 3 is polarized in a direction perpendicular to the plane of the drawing, because it has passed the quarter-wavelength plate 4 twice and thus, is now reflected by the polarizing prism 3. The light flux reflected by the polarizing prism 3 is converged by a condenser lens 7 and a cylindrical lens 8. Since the cylindrical lens 8 has a focussing power only in one direction, the shape of the focussed beam formed by the condenser lens 7 and the cylindrical lens 8 varies as shown in FIG. 1 with respect to an in-focussed condition in mutually orthogonal directions, when the disc 6 moves up and down. In the known apparatus, this variation in shape is detected by a light detector (not shown) divided into four sections and arranged at a focal plane of the lens system 7, 8 to produce a focussing error signal. The focussing error signal thus detected is supplied to a focussing mechanism such as a moving coil mechanism to move the objective lens 5 in its axial direction.

In the known focus detecting system, since a relatively long optical path is required to focus the light beam after being reflected by the polarizing prism 3, there is a drawback that an optical system is likely to be large in size. Further, since the light detector having the four sections must be arranged precisely in three axial directions, i.e. in the optical axis direction and in two orthogonal directions perpendicular to the optical axis, the adjustment in positioning the light detector is quite critical and requires time-consuming work. Moreover, since a dynamic range in which the accurate focussing error signal can be obtained due to the deformation of the focussed beam is relatively small, any focussing error signal could not be produced if the disc deviates from a given position only by a relatively small distance.

SUMMARY OF THE INVENTION

The present invention has for its object to provide a method for detecting a focussing error signal of an objective lens with respect to an object onto which a light spot is to be focussed, which method has an extremely high sensitivity for focus detection.

It is another object of the invention to provide a focussing detection method which can be carried out easily by means of a compact optical system.

According to the invention, a method for detecting a focussing error signal of an objective lens with respect to an object on which a light spot is to be formed by means of said objective lens comprises: focussing light emitted from a light source onto the object; introducing at least a part of a light flux reflected from the object into an optical member including an optical surface which reflects and/or refracts said part of light flux, said optical member being made of material which has a higher refractive index than that of material into which said light flux enters after being refracted by and transmitted through said optical surface; and detecting a variation in distribution of light amount of at least a part of light flux reflected and/or refracted by said optical surface to produce the focussing error signal.

It is another object of the invention to provide an apparatus for detecting a focussing error signal of an objective lens with respect to an object onto which a light spot is to be focussed by means of the objective lens, which apparatus can detect the focussing error signal at a very high sensitivity and can be made small in size and light in weight.

It is still another object of the invention to provide an apparatus for detecting a focussing error signal, in which a light detector can be easily arranged in position without troublesome adjustment and alignment.

According to the invention, an apparatus for detecting a focussing error signal of an objective lens with respect to an object onto which a light beam emitted from a light source is to be focussed as a light spot by means of said objective lens comprises: a beam splitting element arranged between the light source and the objective lens for directing the light beam emitted from the light source to the objective lens and directing a light flux reflected by the object into a direction different from that to the light source; an optical member arranged to receive at least a part of the light flux reflected from said object and including an optical surface which reflects and/or refracts said part of the light flux, said optical member being made of material which has a higher refractive index than that of the material into which the light flux enters after being refracted by and transmitted through said optical surface; light detecting means having at least two light receiving regions arranged to receive at least parts of the light flux reflected and/or refracted by said optical surface to produce output signals representing amounts of light impinging upon the light receiving regions; and a circuit for receiving the output signals from the light detecting means to form a difference signal as the focussing error signal.

DESCRIPTION OF THE PREFERRED EMBODIMENTS

Figure 1:
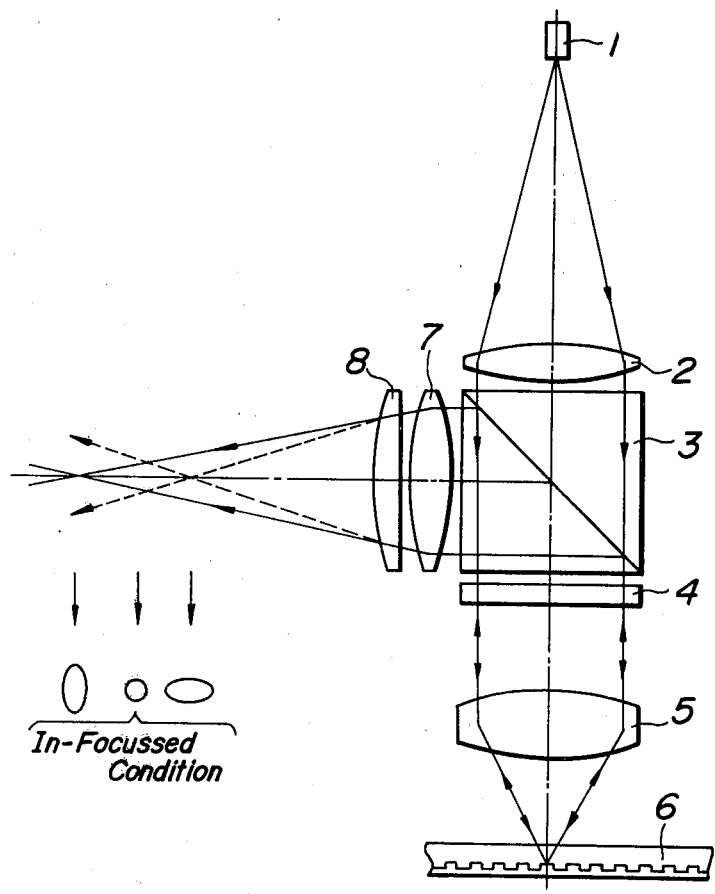
FIG. 1 is a schematic view illustrating an optical system of an optical pick-up apparatus with a known focus detection system.
Figure 2:
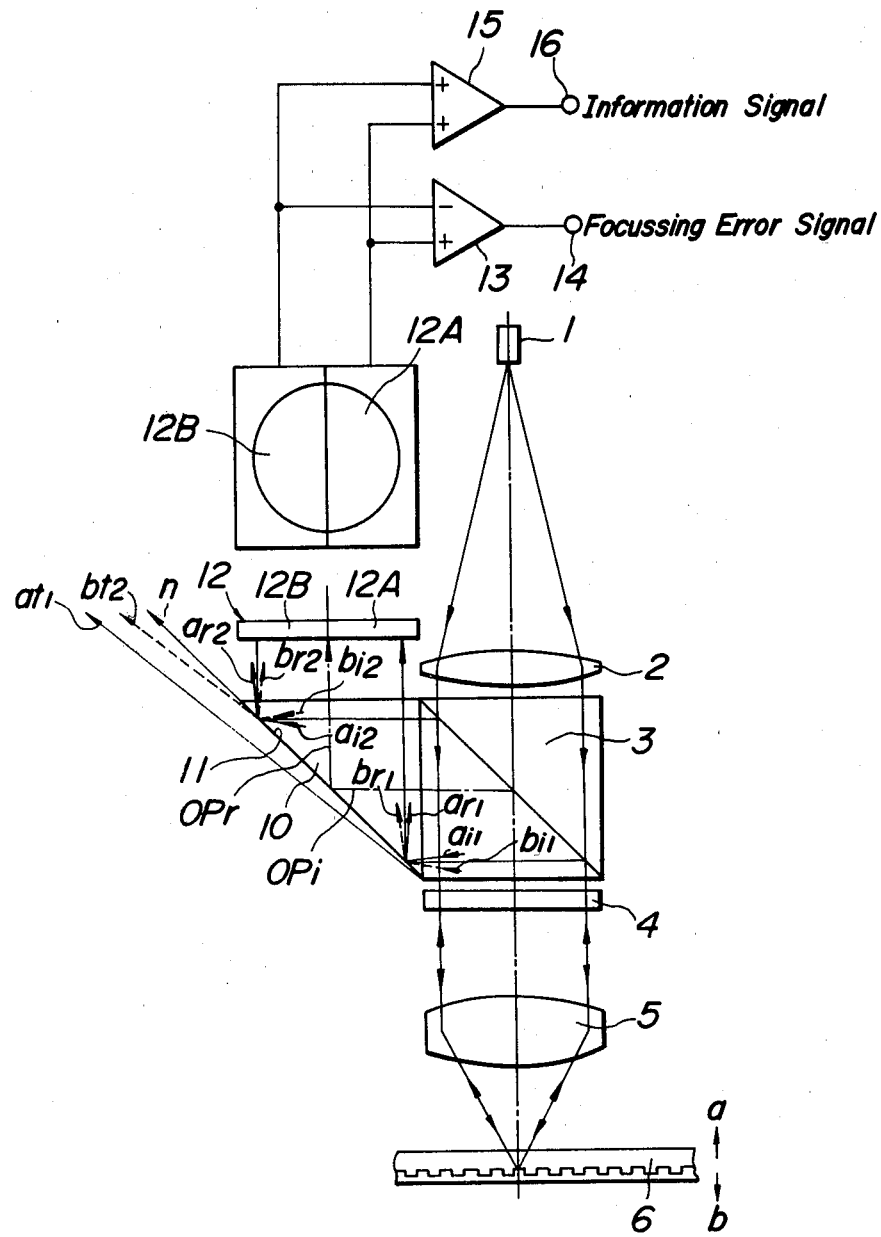
FIG. 2 is a schematic view showing an embodiment of a focus detection apparatus according to the invention.

FIG. 2 is a schematic view illustrating an optical pick-up apparatus in which an embodiment of the focus detection apparatus according to the invention is installed. In this embodiment, an optical system for projecting a scanning light spot onto a record medium is same as that shown in FIG. 1. A linearly polarized light beam emitted from a laser light source 1 is collimated into a parallel light beam by a collimator lens 2 and passes through a polarizing prism 3 and a quarter-wavelength plate 4. Then, the parallel light beam impinges upon an objective lens 5 and is focussed on an information track of a disc 6 as a light spot. The light beam reflected by the disc 6 is optically modulated in accordance with information recorded in the track and is reflected by the polarizing prism 3. The construction and operation of the optical system so far explained are entirely the same as those of the known optical system shown in FIG. 1. The light flux reflected by the polarization prism 3 impinges upon a detection prism 10 having a reflection surface 11 and the light flux reflected by this surface 11 is received by a light detector 12. According to the invention, the reflection surface 11 is so arranged with respect to the incident light that under an in-focussed condition it makes a given angle with respect to the incident light (parallel light flux) which angle is equal to a critical angle or slightly smaller or greater than the critical angle. Now, for the time being, it is assumed that the reflection surface 11 is set at the critical angle. In the in-focussed condition, the whole light flux reflected by the polarizing prism 3 is totally reflected by the reflection surface 11. In practice, a small amount of light is transmitted into a direction n shown in FIG. 2 due to incompleteness of a surface condition of the reflection surface 11. However, such a small amount of transmitted light may be ignored. If the disc 6 deviates from the in-focussed condition in a direction a in FIG. 2 and the distance between the objective lens 5 and the disc 6 is shortened, the light reflected by the polarizing prism 3 is no longer the parallel beam, but changes into a diverging light beam including extreme light rays $a_{i1}$ and $a_{i2}$. On the contrary, if the disc 6 deviates in an opposite direction b, the parallel light beam is changed into a converging light beam including extreme light rays $b_{i1}$ and $b_{i2}$. As can be seen in FIG. 2, light rays from an incident optical axis $OP_i$ to the extreme light ray $a_{i1}$ have incident angles smaller than the critical angle and thus, are transmitted through the reflection surface 11, at least partially. However contrary to this, light rays between the optical axis $OP_i$ and the extreme light ray $a_{i2}$ have incident angles larger than the critical angle and thus are totally reflected by the surface 11. In case of deviation of the disc 6 in the direction b, the above relation becomes inversed, and light rays below a plane which includes the incident optical axis $OP_i$ and perpendicular to the plane of the drawing of FIG. 2, i.e. a plane of incidence, are totally reflected by the reflection surface 11, and light rays above said plane are at least partially transmitted through the reflection surface 11. As explained above, if the disc 6 deviates from the in-focussed position, the incident angles of the light rays impinging upon the reflection surface 11 vary in a continuous manner about the critical angle except for the center light ray passing along the optical axis $OP_i$. Therefore, when the disc 6 deviates from the in-focussed position either in the direction a or b, the intensity of the light reflected by the reflection surface 11 varies abruptly near the critical angle in accordance with the above mentioned variation in the incident angles. In this case, senses of the variations of the light intensities on both sides of said plane perpendicular to the incident plane and including the incident optical axis $OP_i$ vary in mutually opposite manner. On the contrary, in the in-focussed condition, the light flux impinging upon the detection prism 10 is totally reflected by the reflection surface 11 and thus, the uniform light flux impinges upon the light detector 12. The light detector 12 is so constructed that the lower and upper light fluxes with respect to said plane are separately received by separate regions 12A and 12B, respectively. That is to say, the light detector 12 is divided along a plane which is perpendicular to the incident plane and includes an optical axis $OP_r$ of reflected light.

Figure 3:
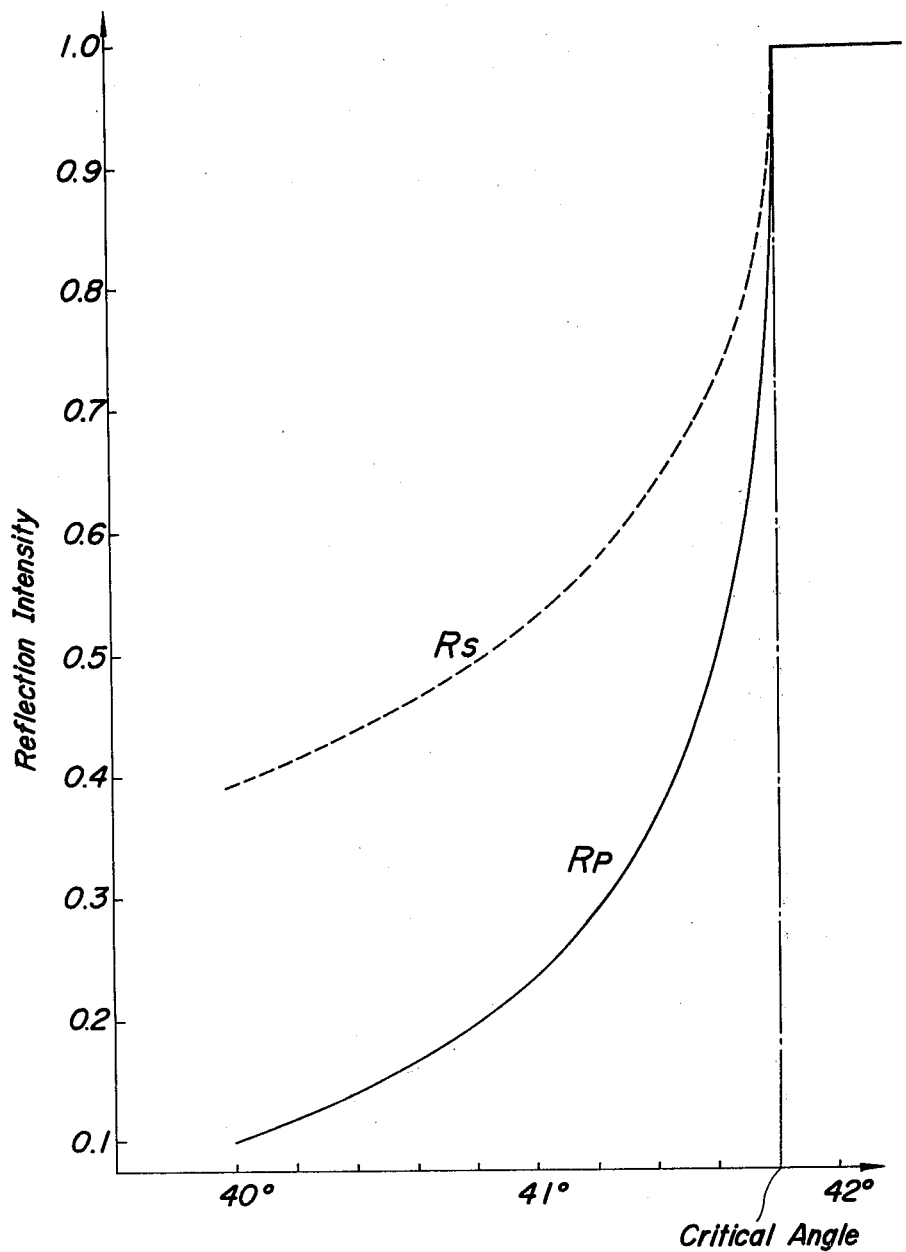
FIG. 3 is a graph showing an intensity of reflected light having an incident angle near a critical angle.

FIG. 3 shows a graph representing the variation of intensity of reflected light in accordance with an incident angle near the critical angle. Curves $R_p$ and $R_s$ indicate the light intensities for polarized light rays, P and S respectively. The curves are obtained when the detection prism 10 is made of material having a refractive index of 1.50. It should be noted that an intensity of a non-polarized light ray is equal to an intermediate valve of $R_p + R_s/2$.

Figure 4A:
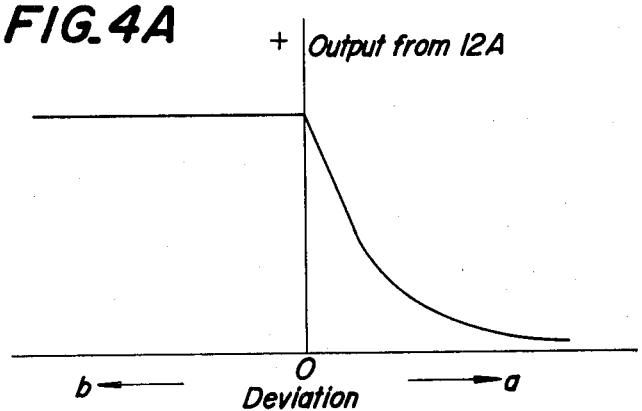
FIGS. 4A, 4B and 4C are graphs showing output signals from light detector regions and a focussing error signal.
Figure 4B:
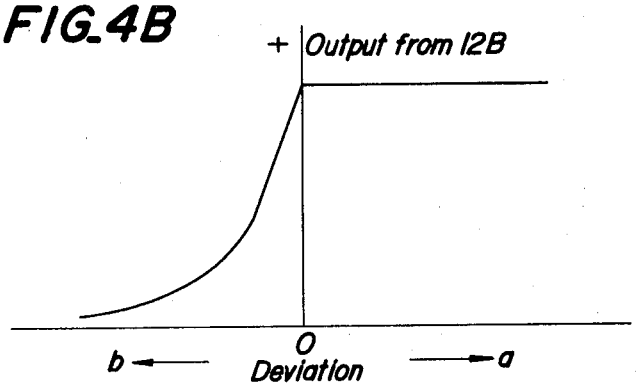
Figure 4C:
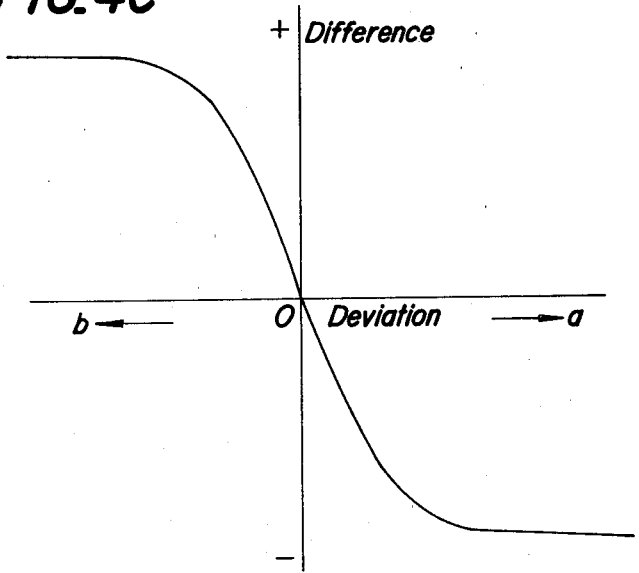

In FIG. 2, if the disc 6 deviates in the direction a, the light rays of the lower half of the incident light flux have incident angles smaller than the critical angle. Therefore, at least a part of the lower half light flux is transmitted through the reflection surface 11 and the amount of light impinging upon the light receiving region 12A is decreased. While the upper half of the incident light flux has the incident angles larger than the critical angle and thus, is totally reflected by the surface 11. Therefore, the amount of light impinging upon the light receiving region 12B is not changed. On the contrary, if the disc 6 deviates in the direction b, the amount of light impinging upon the region 12B is decreased, but the amount of light impinging upon the region 12A is not changed. In this manner, it is possible to obtain the output signals from the regions 12A and 12B as illustrated in FIGS. 4A and 4B, respectively. A focussing error signal can be obtained at an output 14 of a differential amplifier 13 as a difference signal of these signals from the regions 12A and 12B, which difference signal is shown in FIG. 4C.

According to the invention, the reflection surface 11 may be set at an angle slightly smaller than the critical angle. In such a case when the disc 6 deviates in the direction a, the amount of light impinging upon the region 12B is first increased and then becomes constant and the amount of light impinging upon the region 12A is decreased abruptly. Whereas, if the disc 6 deviates in the direction by, the amount of light impinging upon the region 12A is first increased and then becomes constant, while the amount of light impinging upon the region 12B is decreased.

In this manner by detecting a difference in output signals from the light receiving regions 12A and 12B, it is possible to obtain the focussing error signal having an amplitude which is proportional to an amount of the deviation from the in-focussed condition and a polarity which represents a direction of the deviation with respect to the in-focussed condition. The focussing error signal thus obtained is used to effect a focussing control for driving the objective lens 5 in the direction of its optical axis. Further, it is possible to derive an information signal corresponding to the pit information recorded in the information track at an output 16 of an adder 15 which produces a sum signal of the output signals from the regions 12A and 12B. Further, in the in-focussed condition, since the light is scarcely transmitted through the reflection surface 11, the loss of light is very small and in the defocussed condition half of the light flux with respect to the central light ray is totally reflected, but the amount of the other half of the light flux reflected by the surface 11 is decreased to a great extent and, the difference in the amount of light impinging upon the regions 12A and 12B becomes great. Therefore, the very accurate focus detection can be effected with a very high sensitivity.

For instance, when use is made of the objective lens 5 having a numerical aperture NA=0.5 and a focal length f=3 mm and of the detection prism 10 having a refractive index n=1.50 and the disc 6 deviates by about 1 μm, the variation of the incident angle for the extreme right ray which is subjected to the largest variation in incident angle is about 0.015° which can cause a sufficiently large variation in light amount impinging upon the detector regions 12A and 12B. When the disc 6 deviates in the direction a by a distance of about 0.2 mm, a virtual image is formed at 19.5 mm from the objective lens 5 on the side of the disc 6 with respect to the lens 5 and a diameter of light beam impinging upon the detector 12 is increased. On the other hand, when the disc 6 deviates in the direction b by the same distance of 0.2 mm, the real image is formed at 25.5 mm from the objective lens 5 on the side opposite to the disc 6. It is therefore preferable to arrange the detector 12 as close as possible to the objective lens 5. However, if the detector 12 is arranged at the distance of 25.5 mm from the objective lens 5, the bright and dark patterns of light impinging upon the detector 12 are reversed, when the disc 6 deviates in the direction b by a distance more than 0.2 mm, and the amounts of light impinging upon the regions 12A and 12B are decreased and increased, respectively. Therefore, the focussing error signal derived under such a condition is to move the objective lens 5 toward the prism 3 and thus the objective lens 5 further departs from the disc 6. Therefore, undesired impact of the objective lens 5 against the disc 6 can be effectively avoided without providing any particular safety mechanism.

In the embodiment shown in FIG. 2, the refractive index of the detection prism 10 is equal to $\sqrt{2}$ and thus, the light reflected by the surface 11 of detection prism 10 deviates from the incident light by 90°. If the prism 10 is made of material having a refractive index larger than $\sqrt{2}$, the reflected light may make an angle smaller than 90° with respect to the incident light.

Figure 5:
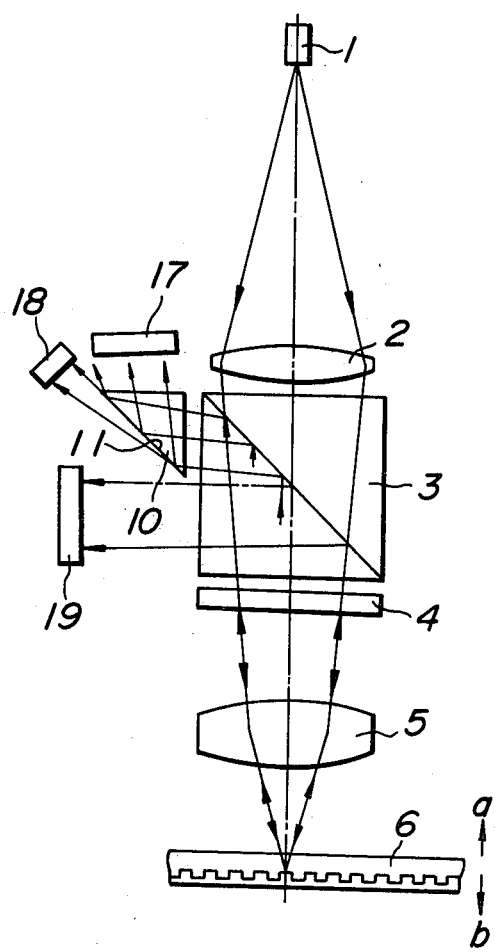
FIG. 5 is a schematic view illustrating another embodiment of the focus detection apparatus according to the invention.

FIG. 5 shows another embodiment of the optical reading apparatus for carrying out the focus detecting method according to the invention. In this embodiment, a part of a light flux reflected by a polarizing prism 3 impinges upon a detection prism 10 having a reflection surface 11 which is so set that in the in-focussed condition, both reflected and transmitted light fluxes are produced at a given ratio. The reflected light is received by a first light detector 17 and the transmitted or refracted light is received by a second light detector 18. The construction of the remaining portion of this apparatus is the same as that of the apparatus illustrated in FIG. 2. To this end, the reflection surface 11 is so arranged that the surface 11 makes an angle with respect to a certain light ray in the reflected light flux, which angle is equal to a critical angle or is slightly smaller than the critical angle. When the disc 6 deviates either in the direction a or b, amounts of output signals from the detectors 17 and 18 become unbalanced to produce a focussing error signal having the amplitude and a polarity which represent an amount and a direction, respectively of the deviation. It should be noted that in the present embodiment, since it is sufficient that the amount of light fluxes impinging upon the detectors 17 and 18 have the given ratio, it is not always necessary for the light flux reflected by the disc 6 to be a parallel light flux, but may be diverged or converged. The information signal corresponding to the pit construction of the information track may be derived as a sum signal of the output signals from the detectors 17 and 18, or alternatively may be derived from a separate light detector 19 arranged to receive that part of the light flux reflected by the polarizing prism 3 which does not enter into the detection prism 10.

In the known focus detection apparatus with a cylindrical lens, a fine spot has to be formed and a center of a light detector divided into four sections has to be aligned with the fine spot. On the contrary, according to the invention, such a cumbersome adjustment is not required. Further, since it is not necessary to construct the light beam, but it may impinge upon the detector as the light flux of a large diameter, an optical alignment and adjustment can be effected very easily. Moreover, since the optical system is not necessary to be adjusted with respect to two orthogonal axes, the detection prism and the light detector can be indexed mechanically in an integral body and the assembly can be rotatably arranged in the plane of the drawings of FIGS. 2 and 5. In the apparatus according to the invention, since the fine spot is not formed on the detector, the optical path can be shortened and thus, the whole assembly can be made small in size and light in weight. This results in that the whole optical assembly can be installed in a two-dimensional driver for driving the objective lens in a direction in parallel with the objective lens and in a direction perpendicular to the optical axis as well as to the information track. In such a system, it is desirous to use an objective lens which is as small as possible. To this end, the number of lens elements of the objective lens (in the drawing, for the sake of simplicity, the objective lens is illustrated as a single lens element, but in practice, it is consisting of a plurality of lens elements) is decreased and only a spherical aberration has to be taken into consideration. Under such circumstances, it is preferable not to use off-axis light rays and a parallel light flux has to be used. According to the invention, such requirements can be advantageously satisfied by detecting the in-focussed condition with the parallel light flux. This feature contributes to miniaturization of the optical system to a great extent. This also may be applied to an objective lens consisting of an aspherical lens. Further, in the embodiments explained above, the optical system is so arranged that the pits of the spiral or concentric information track of the record medium are moved in the plane of the drawings perpendicular to which the reflection surface of the detection prism is arranged. Thus, even if the light spot traverses the track to produce a variation in light distribution, the focussing error signal is not affected at all, because the variation of light distribution appears in the direction perpendicular to the plane of the drawings and such a variation is cancelled in the difference signal.

Figure 6:
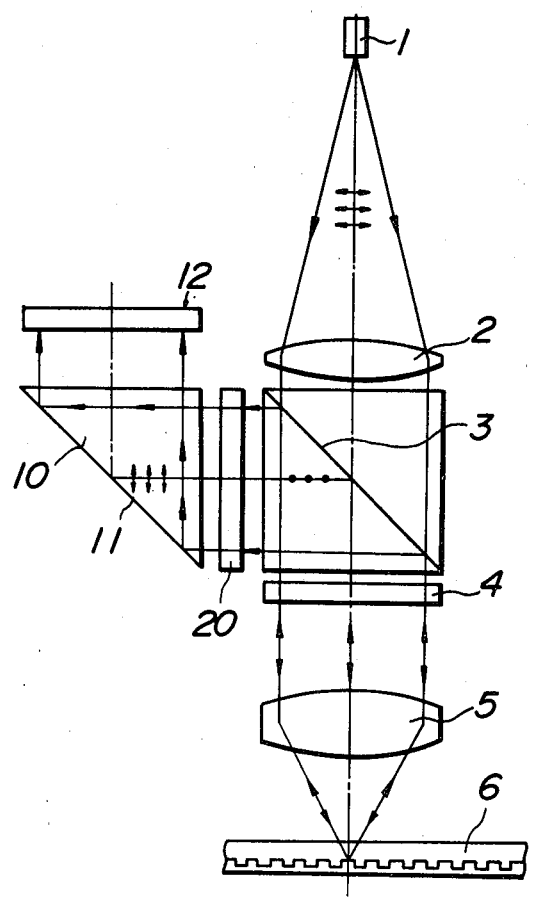
FIGS. 6, 7, 8, 9, 10, 11 and 12 are schematic views depicting modified embodiments of the focus detection apparatus according to the invention.
Figure 7:
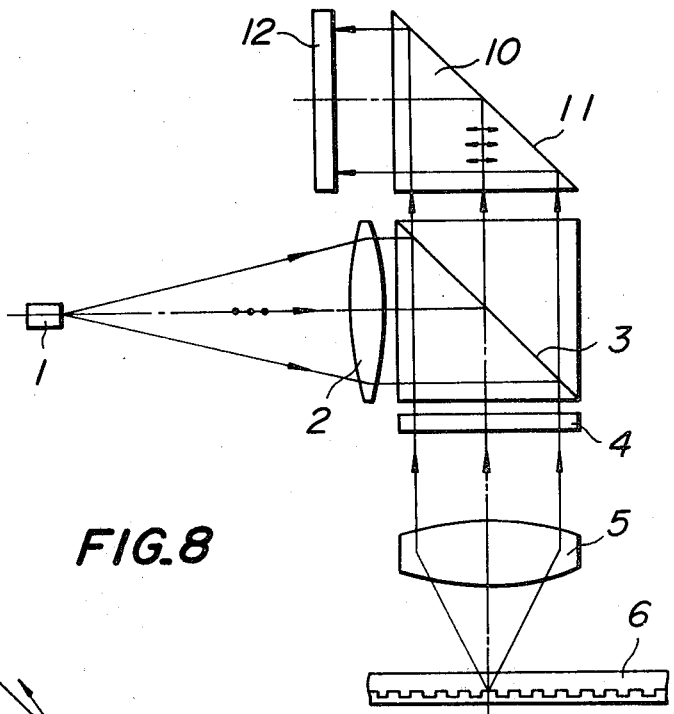
Figure 8:
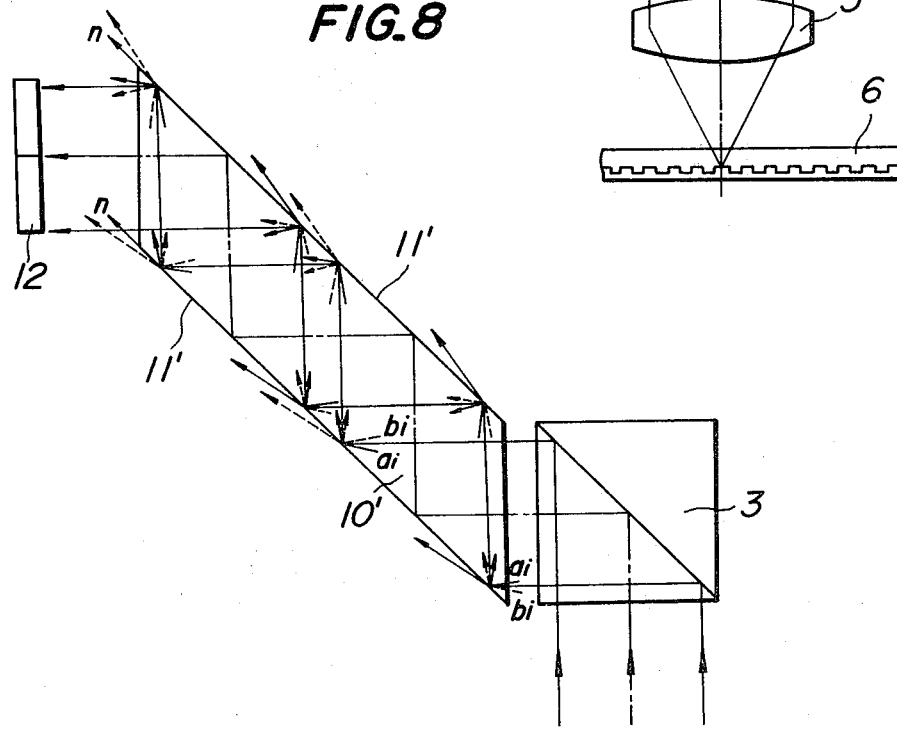
Figure 9:
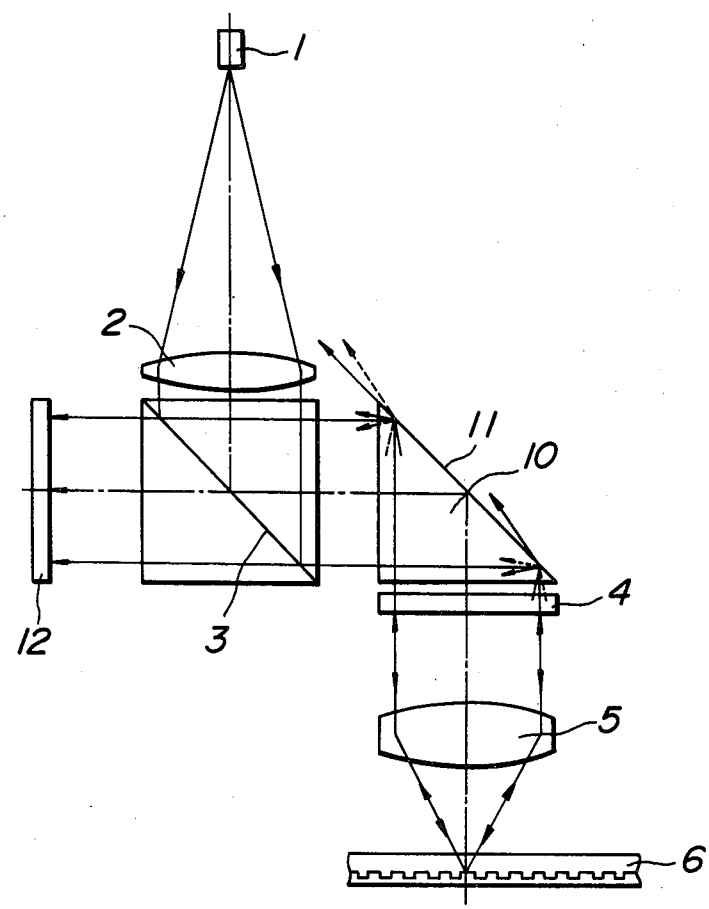
Figure 10:
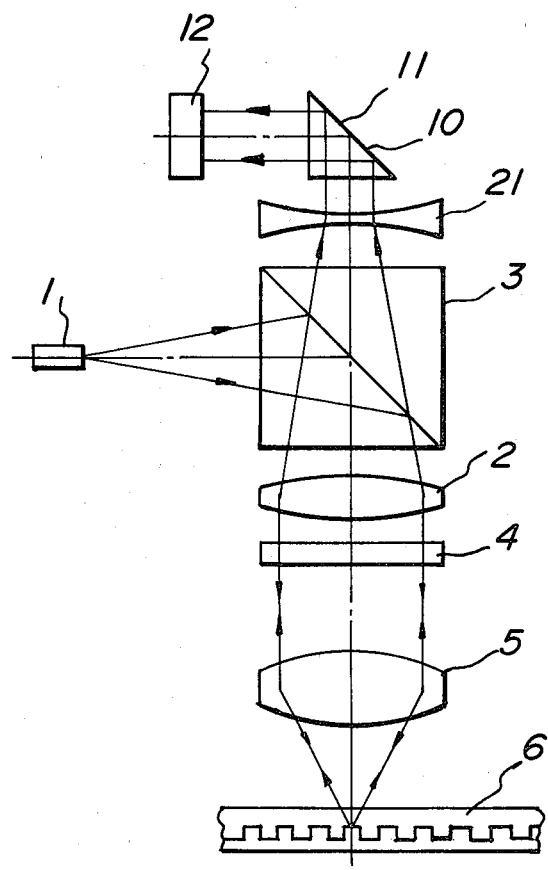

It should be noted that the present invention is not limited to the embodiments explained above, but may be modified in various manners. For instance, in the embodiment shown in FIG. 2, S-polarized light impinges upon the reflection surface 11 of the detection prism 10, but P-polarized light may impinge upon the reflection surface 11 by inserting a 90° rotary polarization element 20 as illustrated in FIG. 6. In such a case, the intensity of reflection light changes extremely abruptly near the critical angle and thus, the sensitivity of the focussing error detection can be further increased. It is also possible to obtain the P-polarized light without the rotary polarizer 20. For instance, the detection prism 10 may be rotated by 90° about the incident axis $OP_i$ in FIG. 2 with respect to the polarizing prism 3 or the transmitted light through the polarizing prism 3 may enter into the detection prism 10 as shown in FIG. 7. In the latter case, the incidence light from a laser light source 1 is reflected by the polarizing prism 3. In order further to increase the detection sensitivity, the light flux may be introduced into an elongated detection prism 10' shown in FIG. 8 and may be reflected several times in the detection prism 10'. In such an embodiment, the amount of light totally reflected by prism surfaces 11' is not changed at all, but the amount of light transmitted through the reflection surfaces 11' is increased by a power of the reflection times. Therefore, the sensitivity can be increased by the power of the reflection times. Further, as shown in an embodiment of FIG. 9, the position of a polarizing prism 3 and a detection prism 10 may be exchanged. In this embodiment, a light beam emitted from a light source 1 is reflected by the polarizing prism 3 and impinges upon the detection prism 10 as an S-polarized beam. Since a reflection surface 11 of the detection prism 10 is set at a critical angle with respect to the incident light beam, the light beam impinges upon a quarter-wavelength plate 4 and an objective lens 5 without loss of light. The light beam reflected by an object 6 passes through the objective lens 5 and the quarter-wavelength plate 4, and impinges upon the detection prism 10 as a P-polarized light beam. Therefore, the detection sensitivity for focussing error is made extremely higher. FIG. 10 illustrates still another embodiment of the focus detecting apparatus according to the invention. In this embodiment, a collimator lens 2 is arranged between a polarizing prism 3 and an objective lens 5, so that a parallel light flux impinges upon the objective lens 5. Thus, a light beam reflected by a disc 6 passes through the polarizing prism 3 as a converging light beam. The converging light beam leaving the polarizing prism 3 is then converted into a parallel beam by means of a concave lens 21, and the parallel beam is made incident upon a detection prism 10 and a light detector 12. In general, it is preferable to make large working distance of the objective lens 5. To this end, a numerical aperture of the objective lens 5 must be large and this results in the fact that the parallel light beam leaving the objective lens 5 is likely to have a large diameter. Thus, if the combination of the collimator lens 2 and the concave lens 21 is omitted, the parallel light beam having the large diameter might impinge upon the detection prism 10 and the detector 12. Therefore, these elements 10 and 12 should have large dimensions. Contrary to this, in the embodiment shown in FIG. 10, since the combination of the collimator lens 2 and the concave lens 21 produces the parallel light beam of the smaller diameter, the detection prism 10 and the detector 12 can be made small in size.

Figure 11:
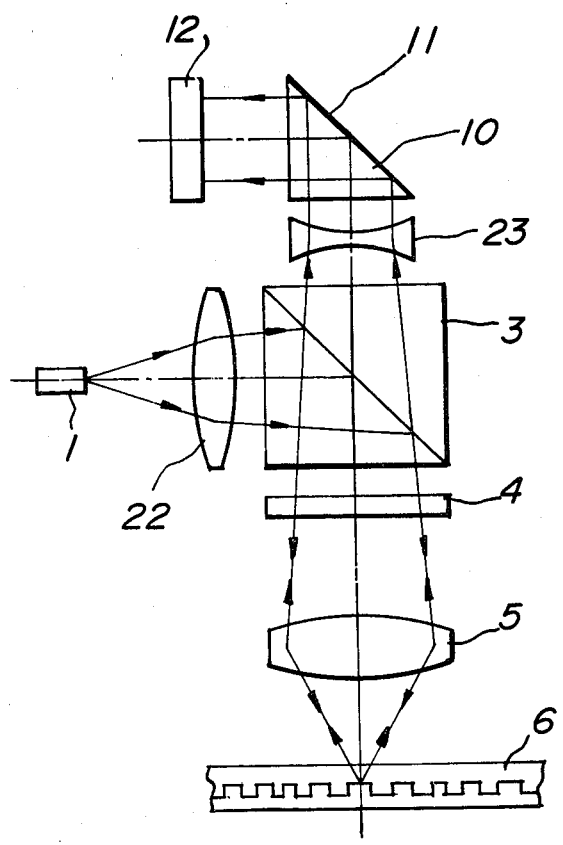

FIG. 11 shows still another embodiment of the focus detection apparatus according to the invention. In this embodiment, a convex lens 22 is arranged between a light source 1 and a polarizing prism 3 and a concave lens 23 is inserted between the polarizing prism 3 and a detection prism 10. In this construction, a diverging light beam impinges upon the objective lens 5 from the polarizing prism 3 and a converging light beam is made incident upon the concave lens 23 and is converted into a parallel light beam. In this manner, the advantage of the embodiment of FIG. 10 can be substantially equally attained. Further, the focus detection methods shown in FIGS. 6 to 9 may be effectively applied to the embodiment shown in FIG. 5.

Figure 12:
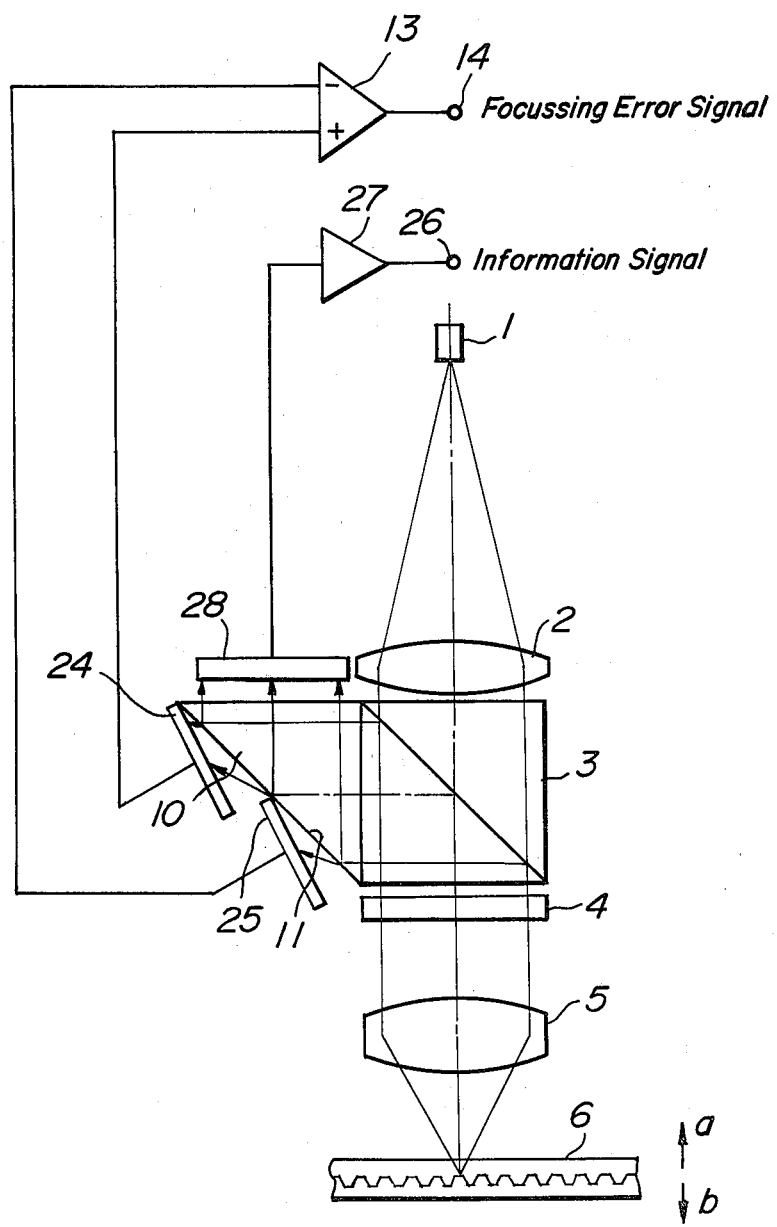
Figure 13A:
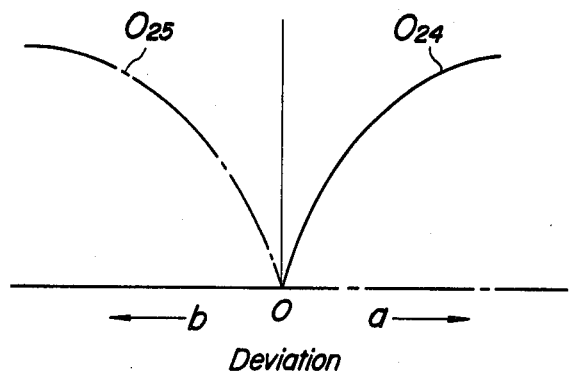
FIGS. 13A and 13B are graphs for explaining an operation of the apparatus shown in FIG. 12.
Figure 13B:
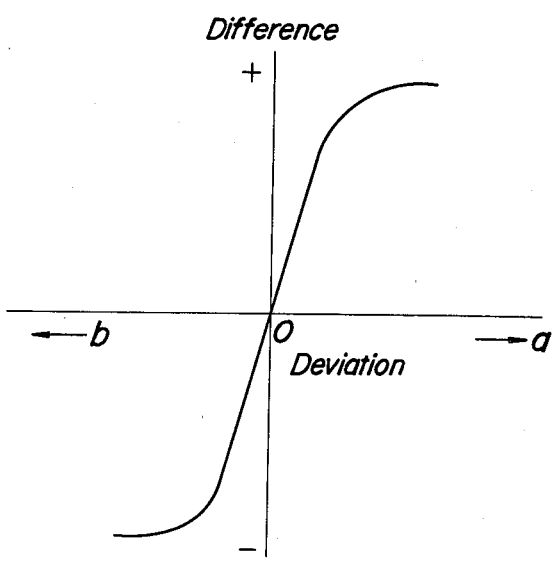

FIG. 12 is a schematic view showing a modification of the embodiment of FIG. 2. The arrangement of a laser light source 1, a collimator lens 2, a polarizing prism 3, a quarter-wavelength plate 4, an objective lens 5 and a detection prism 10 having a reflection surface 11 is entirely the same as that of FIG. 2. In this embodiment in order to detect a difference in the light distribution of refracted and transmitted light rays a pair of light detectors 24 and 25 are arranged as illustrated in FIG. 12. The detector 24 receives light rays transmitted through that portion of the reflection surface 11 which is situated above a plane including an optical axis and perpendicular to the plane of drawing. The detector 25 receives the light rays transmitted through and refracted by a lower portion of the reflection surface 11. Then outputs from the detectors 24 and 25 vary as shown by curves $O_{24}$ and $O_{25}$ in FIG. 13A, when the disc 6 deviates in the directions a and b. Therefore, when a difference between these outputs is produced by a differential amplifier 13, a focussing error signal illustrated in FIG. 13B can be obtained at an output terminal 14. In this case an information signal can be obtained at an amplifier 27 for amplifying an output from a light detector 28 which receives light rays reflected by the surface 11.

Figure 14A:
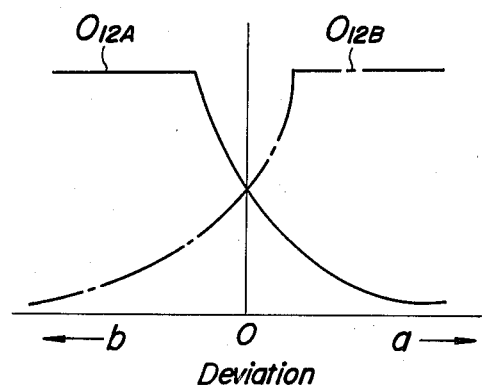
FIGS. 14A and 14B are graphs for explaining an operation of another embodiment of the apparatus according to the invention.
Figure 14B:
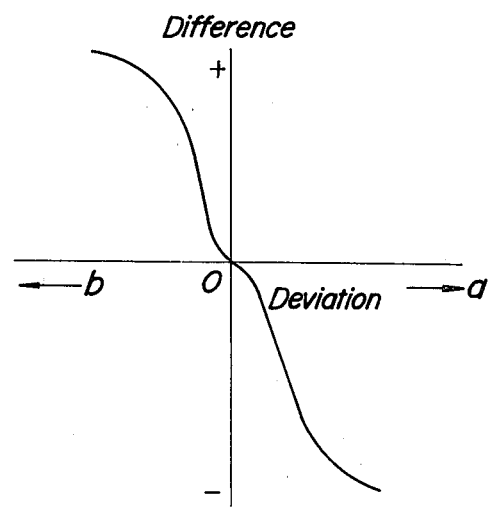

In further modification of the embodiment shown in FIG. 2 the reflection surface 11 of the detection prism 10 is set in such a manner that in an in-focussed condition the parallel light beam is made incident upon the reflection surface 11 at an angle smaller than the critical angle. In such an embodiment outputs from the regions 12A and 12B vary as a function of the deviation of disc 6 as illustrated by curves $O_{12A}$ and $O_{12B}$ in FIG. 14A. Then a difference between these outputs representing a focussing error signal can be derived from the differential amplifier 13 as shown in FIG. 14B. Near the in-focussed position the focussing error signal has a rather small gradient as compared with the previous embodiments, but this results in a particular advantage that even if the reflection surface 11 has been erroneously set to a small extent, a correct focussing error signal can be obtained and stability of the focussing mechanism can be enhanced near the in-focussed condition.

Figure 15A:
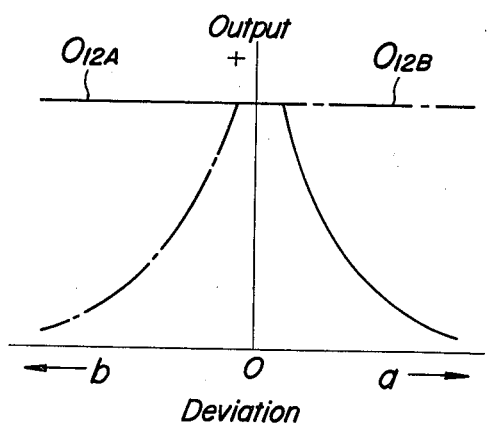
FIGS. 15A and 15B are graphs for explaining an operation of still another embodiment of the apparatus according to the invention.
Figure 15B:
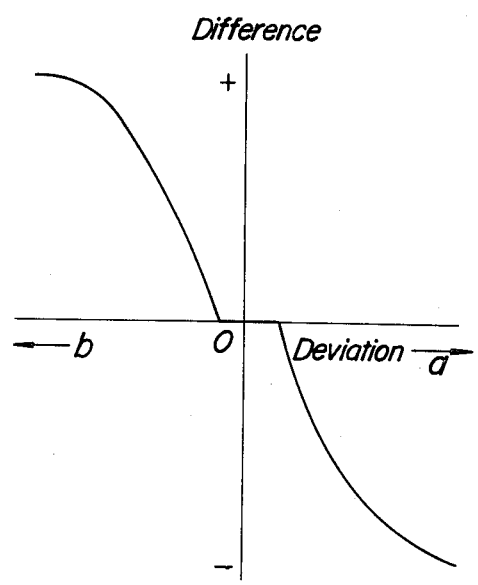

In still another modification of the embodiment shown in FIG. 2, the reflection surface 11 of detection prism 10 is so set that in the in-focussed condition the parallel light flux impinges upon the reflection surface 11 at an angle greater than the critical angle. In this modification outputs from the regions 12A and 12B of the light detector vary as illustrated by curves $O_{12A}$ and $O_{12B}$, respectively in FIG. 15A, when the disc 6 deviates in the directions a and b. Therefore a difference between these outputs is derived as depicted in FIG. 15B. In this case the focussing error signal becomes zero near the in-focussed condition. If a width of this insensitive zone is made substantially equal to a focal depth of the objective lens 5, there might not occur any problem, but the stability of the focussing mechanism near the in-focussed condition can be improved. In the embodiment shown in the drawings, the detection prism has the refractive index of $\sqrt{2}$ for the sake of simplicity, but it may have any desired refractive index as long as the reflection surface is set at or near the critical angle. Further, in the above embodiments, use is made of the polarized light, but according to the invention, non-polarized light may be equally used. In the embodiment shown in FIG. 5, it is sufficient for the reflection surface 11 of the detection prism to be arranged with respect to a single light ray among the light flux impinging upon the surface 11 at an angle equal to the critical angle or slightly smaller than the critical angle. Therefore, either diverging or converging light beam may be used, instead of the parallel light beam. Furthermore, the polarizing prism 3 may be replaced by a half mirror. It should be further noted that the present invention is not limited of the application to the above mentioned optical reading apparatus for the video discs, but may be applied to the focus detection in various optical instruments. Moreover in the above embodiments the optical member is consisting of the detection prism having a suitable refractive index, but it may be constituted by any other element such as a plane glass plate.

What is claimed is:

1. A method for detecting a focussing error signal of an objective lens with respect to an object onto which a light spot is to be formed by means of said objective lens, comprising focussing light emitted from a light source onto the object;

introducing at least a part of a light flux reflected from the object into an optical member including an optical surface which reflects and/or refracts said part of the light flux, said optical member being made of material which has a higher refractive index than that of the material into which said light flux enters after being refracted by and transmitted through said optical surface, said optical surface being set so that a given light ray in said part of the light flux is made incident upon the optical surface at an angle which is substantially equal to a given critical angle when said objective lens is in an in-focussed condition; and detecting a variation in distribution of light amount of at least a part of the light flux reflected and/or refracted by said optical surface to produce a focussing error signal.

2. A method according to claim 1, wherein said optical surface is so set that a given light ray in said part of the light flux is made incident upon the optical surface at an angle which is smaller than the critical angle when said objective lens is in an in-focussed condition.

3. A method according to claim 1, wherein said optical surface is so set that a given light ray in said part of the light flux is made incident upon the optical surface at an angle which is greater than the critical angle when said objective lens is in an in-focussed condition.

4. A method according to any one of claims 2 or 3, wherein said given light ray is a center light ray of the light flux.

5. A method according to claim 1, wherein a light flux reflected by the optical surface and situated on one side of a boundary plane which includes said light ray and is perpendicular to a plane of incidence, and a light flux reflected by the optical surface and situated on the other side of said boundary plane are separately detected.

6. A method according to claim 1, wherein a light flux reflected by the optical surface and a light flux refracted by and transmitted through the optical surface are separately detected.

7. A method according to claim 1, wherein a light flux refracted by and transmitted through the optical surface and situated on one side of a boundary plane which includes said light ray and is perpendicular to a plane of incidence, and a light flux refracted by and transmitted through the optical surface and situated on the other side of said boundary plane are separately detected.

8. A method according to claim 1, wherein the light flux reflected by the object impinges upon the optical surface as a parallel light flux in the in-focussed condition.

9. A method according to claim 1, wherein the light flux reflected by the object impinges upon the optical surface as a diverging light flux in an in-focussed condition.

10. A method according to claim 1, wherein the light flux reflected by the object impinges upon the optical surface as a converging light flux in an in-focussed condition.

11. A method according to claim 1, wherein the light flux impinging upon the optical surface is a P-polarized light flux.

12. A method according to claim 1, wherein the light flux reflected by the object is reflected by the optical surface by a plurality of times.

13. An apparatus for detecting a focussing error signal of an objective lens with respect to an object onto which a light beam emitted from a light source is to be focussed as a light spot by means of said objective lens comprising
　a beam splitting element arranged between the light source and the objective lens for directing the light beam emitted from the light source to the objective lens and directing a light flux reflected by the object into a direction different from that to the light source;
　an optical member arranged to receive at least a part of the light flux reflected from said object and including an optical surface which reflects and/or refracts said part of light flux, said optical member being made of material which has a higher refractive index than that of material into which the light flux enters after being refracted by and transmitted through said optical surface, said optical member being arranged so that the optical surface makes an angle with respect to a given light ray in incident light flux which is substantially equal to the critical angle;
　light detecting means having at least two light receiving regions arranged to receive at least parts of light flux reflected and/or refracted by said optical surface to produce output signals representing amounts of light impinging upon the light receiving regions; and
　a circuit for receiving the output signals from the light detecting means to form a difference signal as the focussing error signal.

14. An apparatus according to claim 13, wherein said optical member is consisting of a detection prism.

15. An apparatus according to claim 13, wherein said light receiving regions are so arranged to receive separately a light flux reflected by the optical surface and situated on one side of a boundary plane which includes an optical axis of the optical member and is perpendicular to a plane of incidence, and a light flux reflected by the optical surface and situated on the other side of said boundary plane, respectively.

16. An apparatus according to claim 13, wherein said light receiving regions are so arranged to receive separately a light flux reflected by the optical surface, and a light flux refracted by and transmitted through the optical surface, respectively.

17. An apparatus according to claim 13, wherein said light receiving regions are so arranged to receive separately a light flux refracted by and transmitted through the optical surface and situated on one side of a boundary plane which includes an optical axis of the optical member and is perpendicular to a plane of incidence, and a light flux refracted by and transmitted through the optical surface and situated on the other side of said boundary plane are separately detected.

18. An apparatus according to claim 13, wherein said beam splitting element is constituted by a polarizing prism and a polarized light flux impinges upon the optical surface.

19. An apparatus according to claim 18, further comprising a quarter-wavelength plate arranged between the polarizing prism and the objective lens.

20. An apparatus according to claim 18, wherein the polarized light flux is a P-polarized light flux.

21. An apparatus according to claim 13, further comprising a collimator lens arranged between the light source and the objective lens to introduce a parallel light flux to the optical surface.

22. An apparatus according to claim 13, wherein the optical member is so arranged that the optical surface makes with respect to a given light ray in incident light flux an angle which is smaller than a critical angle.

23. An apparatus according to claim 13, wherein the optical member is so arranged that the optical surface makes with respect to a given light ray in incident light flux an angle which is greater than a critical angle.

24. An apparatus according to claim 13, wherein said light flux impinging upon the optical surface is a parallel light flux in an in-focussed condition of the objective lens.

25. An apparatus according to claim 13, wherein the light flux impinging upon the optical surface is a converging light flux in an in-focussed condition of the objective lens.

26. An apparatus according to claim 13, wherein the light flux impinging upon the optical surface is a diverging light flux in an in-focussed condition of the objective lens.

27. An apparatus according to claim 19, wherein the optical member is arranged between the polarizing prism and the light detecting means to receive at least a part of the light flux reflected by the polarizing prism, and the light emitted from the light source is transmitted through the polarizing prism.

28. An apparatus according to claim 19, wherein the optical member is arranged between the polarizing prism and the light detecting means to receive at least a part of the light flux transmitted through the polarizing prism, and the light emitted from the light source is reflected by the polarizing prism.

29. An apparatus according to claim 19, wherein the optical member is arranged between the polarizing prism and the objective lens, the light emitted from the light source is reflected by the polarizing prism and then is totally reflected by the optical surface, and the light flux reflected by the object is reflected by the optical surface and then is transmitted through the polarizing prism.

30. An apparatus according to claim 19, wherein the optical member is arranged between the polarizing prism and the objective lens, the light emitted from the light soruce is transmitted through the polarizing prism and then is totally reflected by the optical surface, and the light flux reflected by the object is reflected by the optical surface and then is reflected by the polarizing prism.

31. An apparatus according to claim 27, further comprising a 90° rotating element arranged between the polarizing prism and optical member so that the P-polarized light flux impinges upon the optical surface.

32. An apparatus according to claim 26, further comprising a converging lens arranged between the light source and the objective lens, so that the diverging light flux impinges upon the optical surface.

33. An apparatus according to claim 25, further comprising a diverging lens arranged between the light source and the objective lens, so that the converging light flux impinges upon the optical surface.

34. An apparatus according to claim 14, wherein the detection prism is a rectangular shape having such a length that the light flux is reflected by the optical surfaces by a plurality of times.

35. An apparatus according to claim 27 or 28, further comprising a collimator lens arranged between the polarizing prism and the objective lens for introducing a parallel light beam into the objective lens and a concave lens arranged between the polarizing prism and the optical member for converting the incident converging light beam into a parallel light beam.

36. An apparatus according to claim 27 or 28, further comprising a convex lens arranged between the light source and the polarizing prism for introducing the converging light beam into the objective lens, and a concave lens arranged between the polarizing prism and the detection prism for converting the converging incident light beam into a parallel light beam.

* * * * *